(12) United States Patent
Chaussee et al.

(10) Patent No.: US 10,745,113 B2
(45) Date of Patent: Aug. 18, 2020

(54) WING TIP DEVICE ATTACHMENT APPARATUS AND METHOD

(71) Applicant: Airbus Operations Limited, Bristol (GB)

(72) Inventors: Julien Chaussee, Bristol (GB); Camille Paumes, Bristol (GB); Norman Wijker, Bristol (GB); Stuart Alexander, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 16/369,222

(22) Filed: Mar. 29, 2019

(65) Prior Publication Data

US 2019/0225325 A1 Jul. 25, 2019

Related U.S. Application Data

(63) Continuation of application No. 15/295,262, filed on Oct. 17, 2016, now Pat. No. 10,279,895, which is a continuation of application No. 13/317,784, filed on Oct. 28, 2011, now Pat. No. 9,499,255.

(30) Foreign Application Priority Data

Oct. 28, 2010 (GB) .................................. 1018185.7

(51) Int. Cl.
*B64C 23/06* (2006.01)
*B64C 3/56* (2006.01)

(52) U.S. Cl.
CPC .............. *B64C 23/072* (2017.05); *B64C 3/56* (2013.01); *Y02T 50/164* (2013.01); *Y10T 29/49826* (2015.01)

(58) Field of Classification Search
CPC .................................................. B64C 23/072; B64C 3/56; B64C 3/02; Y02T 50/164; Y10T 29/49826

See application file for complete search history.

(56) References Cited

U.S. PATENT DOCUMENTS

| 1,348,374 | A | * | 8/1920 | Plym | ......................... | B64C 3/00 |
| | | | | | | 244/123.8 |
| 1,779,113 | A | * | 10/1930 | Carns | ....................... | B64C 9/00 |
| | | | | | | 244/123.4 |
| 1,803,030 | A | * | 4/1931 | Messerschmitt | .......... | B64C 3/00 |
| | | | | | | 244/123.8 |
| 1,804,823 | A | * | 5/1931 | Blondin | .................... | B64C 3/00 |
| | | | | | | 244/123.1 |

(Continued)

FOREIGN PATENT DOCUMENTS

| EP | 0 271 757 | 6/1988 |
| EP | 2 218 640 | 8/2010 |

OTHER PUBLICATIONS

UK Search Report dated Feb. 15, 2011 for GB 1018185.7 (1 page).
UK Search Report dated Jul. 8, 2011 for GB 1018185.7 (2 pages).

*Primary Examiner* — Medhat Badawi
(74) *Attorney, Agent, or Firm* — Nixon & Vanderhye P.C.

(57) ABSTRACT

A method of assembling a wing tip device to a wing of a powered aircraft including: providing a wing tip, providing a wing tip device, pivotably attaching the wing tip device to the wing at a first position, pivoting the wing tip device about the first position, and attaching the wing tip device to the wing at a second position spaced from the first position.

11 Claims, 8 Drawing Sheets

(56) References Cited

U.S. PATENT DOCUMENTS

| | | | | |
|---|---|---|---|---|
| 1,806,586 A * | 5/1931 | Christmas | ................ | B64C 3/00 244/118.5 |
| 1,956,823 A * | 5/1934 | Carns | ..................... | B64C 3/00 244/123.4 |
| 2,222,997 A * | 11/1940 | Bellanca | ................... | B64C 3/54 244/218 |
| 2,292,613 A * | 8/1942 | Chapman | ................ | B64C 3/54 244/218 |
| 2,375,075 A * | 5/1945 | Carruth | ................ | B64D 47/06 244/129.1 |
| 2,420,433 A * | 5/1947 | Kraaymes | ................ | B64C 3/54 244/218 |
| 3,645,477 A * | 2/1972 | Kratschmar | ............. | B64C 3/40 244/46 |
| 3,737,121 A * | 6/1973 | Jones | ........................ | B64C 3/40 244/13 |
| 4,228,977 A * | 10/1980 | Tanaka | ................... | A63H 27/08 244/153 R |
| 4,245,804 A * | 1/1981 | Ishimitsu | ............. | B64C 23/069 244/91 |
| 4,247,062 A * | 1/1981 | Brueckner | ............... | B64C 5/08 244/36 |
| 4,457,479 A * | 7/1984 | Daude | ...................... | B64C 5/08 244/203 |
| 4,598,885 A * | 7/1986 | Waitzman | ............... | B64C 3/185 244/13 |
| 4,671,470 A * | 6/1987 | Jonas | .................. | B29C 66/4326 244/119 |
| 4,671,473 A * | 6/1987 | Goodson | .............. | B64C 23/076 244/199.4 |
| 4,722,499 A * | 2/1988 | Klug | ..................... | B64C 23/076 244/199.4 |
| 4,824,053 A * | 4/1989 | Sarh | ...................... | B23Q 1/601 244/218 |
| 4,881,700 A * | 11/1989 | Sarh | .......................... | B60F 5/02 244/2 |
| 4,986,493 A * | 1/1991 | Sarh | .......................... | B60F 5/02 244/2 |
| 5,288,039 A * | 2/1994 | DeLaurier | ................ | B64C 3/52 244/219 |
| 5,348,253 A * | 9/1994 | Gratzer | ................ | B64C 23/069 244/91 |
| 5,350,135 A * | 9/1994 | Renzelmann | ............ | B64C 3/56 244/49 |
| 5,356,094 A * | 10/1994 | Sylvain | ..................... | B64C 3/56 244/123.9 |
| 5,379,969 A * | 1/1995 | Marx | ...................... | B64C 3/56 244/49 |
| 5,381,986 A * | 1/1995 | Smith | ....................... | B64C 3/56 244/49 |
| 5,407,153 A * | 4/1995 | Kirk | ...................... | B64C 23/069 244/199.4 |
| 5,427,329 A * | 6/1995 | Renzelmann | ............ | B64C 3/56 244/49 |
| 5,558,299 A * | 9/1996 | Veile | ......................... | B64C 3/56 244/49 |
| 5,645,250 A * | 7/1997 | Gevers | ..................... | B64C 1/00 244/101 |
| 5,850,990 A | 12/1998 | Gevers | | |
| 5,988,563 A * | 11/1999 | Allen | ....................... | B64C 3/42 244/49 |
| 6,076,766 A * | 6/2000 | Gruensfelder | ............ | B64C 3/56 244/130 |
| 6,098,927 A | 8/2000 | Gevers | | |
| 6,190,484 B1 * | 2/2001 | Appa | ...................... | B29C 70/32 156/189 |
| 6,224,012 B1 * | 5/2001 | Wooley | ..................... | B60F 5/02 244/121 |
| 6,227,487 B1 * | 5/2001 | Clark | ........................ | B64C 5/08 244/99.12 |
| 6,260,799 B1 * | 7/2001 | Russ | ......................... | B64C 3/56 244/49 |
| 6,834,835 B1 * | 12/2004 | Knowles | .................... | B64C 3/54 244/198 |
| 6,886,778 B2 | 5/2005 | McLean | | |
| 7,497,403 B2 * | 3/2009 | McCarthy | ............. | B64C 23/072 244/199.4 |
| 7,866,610 B2 | 1/2011 | Bousfield | | |
| 8,089,034 B2 * | 1/2012 | Hammerquist | ........... | B64C 3/56 244/3.27 |
| 8,651,431 B1 * | 2/2014 | White | .................... | B64C 23/076 244/218 |
| 8,998,132 B2 * | 4/2015 | Burris | ....................... | B64C 9/04 244/99.3 |
| 9,469,391 B1 * | 10/2016 | Dong | ..................... | B64C 3/385 |
| 9,499,255 B2 * | 11/2016 | Chaussee | ............. | B64C 23/072 |
| 9,701,392 B2 * | 7/2017 | Whitlock | ................ | B64C 3/187 |
| 9,896,186 B2 * | 2/2018 | Fong | ..................... | B29C 70/222 |
| 2004/0262451 A1 | 12/2004 | McLean | ................ | B64C 3/10 244/45 R |
| 2005/0133672 A1 * | 6/2005 | Irving | ................... | B64C 23/072 244/201 |
| 2005/0230531 A1 * | 10/2005 | Horinouchi | ............... | B64C 3/10 244/47 |
| 2005/0276657 A1 * | 12/2005 | Yumikino | ............. | A61F 5/0125 403/92 |
| 2007/0018049 A1 * | 1/2007 | Stuhr | .................... | B64C 23/069 244/124 |
| 2008/0191099 A1 * | 8/2008 | Werthmann | .......... | B64C 23/065 244/199.4 |
| 2008/0308683 A1 * | 12/2008 | Sankrithi | ............. | B64C 23/076 244/199.4 |
| 2009/0148302 A1 * | 6/2009 | Leahy | ................... | B64C 27/463 416/224 |
| 2009/0166477 A1 * | 7/2009 | Bousfield | .................... | B64C 3/18 244/218 |
| 2009/0200423 A1 * | 8/2009 | Tucker | ....................... | B64C 3/18 244/123.1 |
| 2010/0084516 A1 * | 4/2010 | Eberhardt | ................. | B64C 3/54 244/218 |
| 2012/0032023 A1 * | 2/2012 | Bousfield | ................ | B64C 37/00 244/49 |
| 2013/0099060 A1 * | 4/2013 | Dees | .......................... | B64C 3/56 244/199.4 |
| 2014/0361539 A1 * | 12/2014 | Carter | ....................... | F03D 7/06 290/44 |
| 2015/0097087 A1 * | 4/2015 | Sakurai | ..................... | B64C 9/00 244/201 |
| 2016/0185444 A1 * | 6/2016 | Gionta | ..................... | B64C 3/56 244/49 |

\* cited by examiner

WING TIP DEVICE ATTACHMENT APPARATUS AND METHOD

RELATED APPLICATIONS

This application is a continuation of U.S. patent application Ser. No. 15/295,262 filed Oct. 17, 2016, which is a continuation of U.S. patent application Ser. No. 13/317,784 (now U.S. Pat. No. 9,499,255) filed Oct. 28, 2011, and claims priority to GB Application No. 1018185.7, filed 28 Oct. 2010, the entire contents of these applications are incorporated by reference.

BACKGROUND

The present invention is concerned with wing tip device attachment apparatus and method. More particularly, the present invention is concerned with an apparatus and method for attaching a wing tip device such as a winglet to the tip of a passenger aircraft wing.

Wing tip devices are well known in the art. Devices such as winglets, raked wing tips and fences are collectively known as aerodynamic wing tip devices and are used to reduce the effects of lift induced drag.

Lift induced drag is caused by the generation of vortices at the wing tip. Such drag is mitigated by an increase in wing span. Increases in wing span in the plane of the wing are not always possible due to space requirements at, e.g. airports. As such out-of-plane extensions to the wing are commonly used to increase the effective wing span without increasing the geometric span of the aircraft. These take the form of aerodynamic wing tip devices.

There is an ever increasing drive to increase the efficiency of passenger aircraft. One way to achieve increased efficiency is to increase the size of the aerodynamic wing tip device. Typical ratios of winglet span to the thickness of the wing tip at the attachment point (wingbox thickness) are commonly above 10 and may be as high as 12 to 15 in modern passenger aircraft. Because the thickness of the wing is low at the tip, the vertical moment arm available to react to the loads generated by the wing tip device under both its own weight and under aerodynamic forces is low. Therefore, the forces and stresses generated in this area are high.

Other wing tip devices include external tanks, refuelling pods etc whose primary purpose is not to improve the aerodynamic efficiency of the wing, but nerveless are attached to, and produce a force on, the wing tip.

Known wing tip devices are generally attached in one of two manners. The first is to use a series of splice plates or butt straps which span the upper and lower skins of the wing tip device and the wingbox at the point at which they join.

The second method is to use abutting plates joined by tension bolts.

Disadvantageously, both of these methods only utilise a very small moment arm to react the loads. The splice plates transfer load through the wing skin, which is primarily designed to absorb the bending load across the wing span, and less well suited to absorb local, concentrated, loads. As such, the large local load introduced into the wing skin requires structural reinforcement. The additional weight this causes is undesirable.

Further, because the wing skin is not particularly strong, many joining locations are required to spread the applied load. Although this has the desired effect of reducing the load per joining location, it creates a statically indeterminate system making the loads at each point difficult to predict. Therefore each joint is typically over-engineered adding weight and cost to the aircraft.

Cyclic loading is common in aircraft. This introduces additional structural requirements, in particular to the tension bolt design. In order to mitigate the effects of fatigue, the bolts have to be pre-tensioned with an interference fit. This is undesirable as it adds complexity to the manufacturing process, and makes maintenance and replacement more difficult A still further problem with the above two methods is that because of the heavy bolting and large surface area of contact between the various components in both methods, the interface between the parts is quite sensitive to differences in geometry at the interface. As such, any mis-match between the two components needs to be addressed with fettling upon assembly. This increases the cost of assembly and makes it more difficult to replace the wing tip devices in service.

Further, temperature effects and loading in use can cause differential expansion/contraction of the wing tip device and the wing tip, which can cause high stresses at the mounting points.

SUMMARY OF INVENTION

It is an aim of the present invention to overcome or at least mitigate one or more of the above problems.

According to a first aspect of the invention there is provided a wing tip device for attachment to a wing tip of a powered aircraft, the wing tip device comprising: a first mounting formation, a second mounting formation spaced apart in a spanwise direction relative to the first mounting formation, a third mounting formation spaced apart in a chordwise direction relative to the first and second mounting formations, wherein each of the first, second and third mounting formations are configured for attachment to at least one of a wing spar and a wing rib, and, at least one of the mounting formations is configured so that relative movement in the spanwise direction of the wing tip device to a wing tip is permitted in use.

Advantageously, thermally induced spanwise relative expansions and contractions between the wing tip device and wing tip do not cause excessive stresses because of the relative movement permitted therebetween. Similarly, relative movement resulting from flexing of the wings is permitted without causing significant stresses.

Further, by designing the system such that certain attachment points are not required to react the incident forces, they can be designed as such, increasing the predictability of force magnitude on the other attachment points, and moving the system towards static determinacy.

Preferably the mounting formations are arranged such that relative movement is permitted at least two of the mounting formations to provide a statically determinate loading system. More preferably another of the mounting formations is configured so that relative movement in the chordwise direction of the wing tip device to the wing tip is permitted, and still another of the mounting formations is configured so that relative movement in the vertical direction of the wing tip device to the wing tip is permitted.

Wing spars are load-bearing components and if constructed from composite, also tend to be over-engineered (i.e. thicker than necessary) in the region of the wing tip because they are not easily tapered from the fuselage.

The present invention utilises this material to react the loads from the winglet. Further, the rear spar extends across the entire span of the wing, and as such a large moment arm can be incorporated into the design to reduce the local loads and stresses.

Still further, given the mounting formation arrangement prescribes a statically determinate assembly, it will be known what loads (type and magnitude) will be felt where, thus meaning that the structures can be more efficiently engineered, without the need to account for uncertainties in the amount of load reacted by a given component.

According to a second aspect of the invention there is provided a wing tip device for a powered aircraft comprising a mounting member extending from the wing tip, the first mounting member defining a first attachment formation comprising a first pivotable joint means for rotation about a first axis at a first position proximate the wing tip device, and defining a second attachment formation distal to the wing tip device.

Such a structure permits rotation of the wing tip device into position about the first pivotable joint means and subsequent attachment at the second attachment point. It will be noted that by "pivotable joint means" we mean, inter alia, a pivot shaft, pivot bore or pivot assembly.

According to a third aspect of the invention there is provided a method of assembling a wing tip device to a wing of a powered aircraft comprising the steps of providing a wing tip, providing a wing tip device, pivotably attaching the wing tip device to the wing at a first position, pivoting the wing tip device about the first position, attaching the wing tip device to the wing at a second position spaced from the first position.

Advantageously, the method permits easy installation of wing tip devices upon assembly and in service.

According to a fourth aspect of the invention there is provided an aircraft wing subassembly comprising a wing skin defining a first outer surface, and a structural reinforcement member within the wing, the structural reinforcement member defining a second outer surface, which structural reinforcement member is arranged within the wing such that the first outer surface and the second outer surface form part of an outer wing surface.

Advantageously, by using the reinforcement as part of the wing skin, the reinforcement can be made as large as possible, thus providing maximum resistance to bending moments.

SUMMARY OF DRAWINGS

A wing tip device attachment apparatus and method in accordance with the invention will now be described by way of example and with reference to the accompanying figures in which:

FIG. 3a is a view of a wing tip device and mounting apparatus in accordance with the present invention;

FIG. 3b is a schematic view of the wing tip device and mounting apparatus of FIG. 3a;

DETAILED DESCRIPTION OF INVENTION

Figure 1:
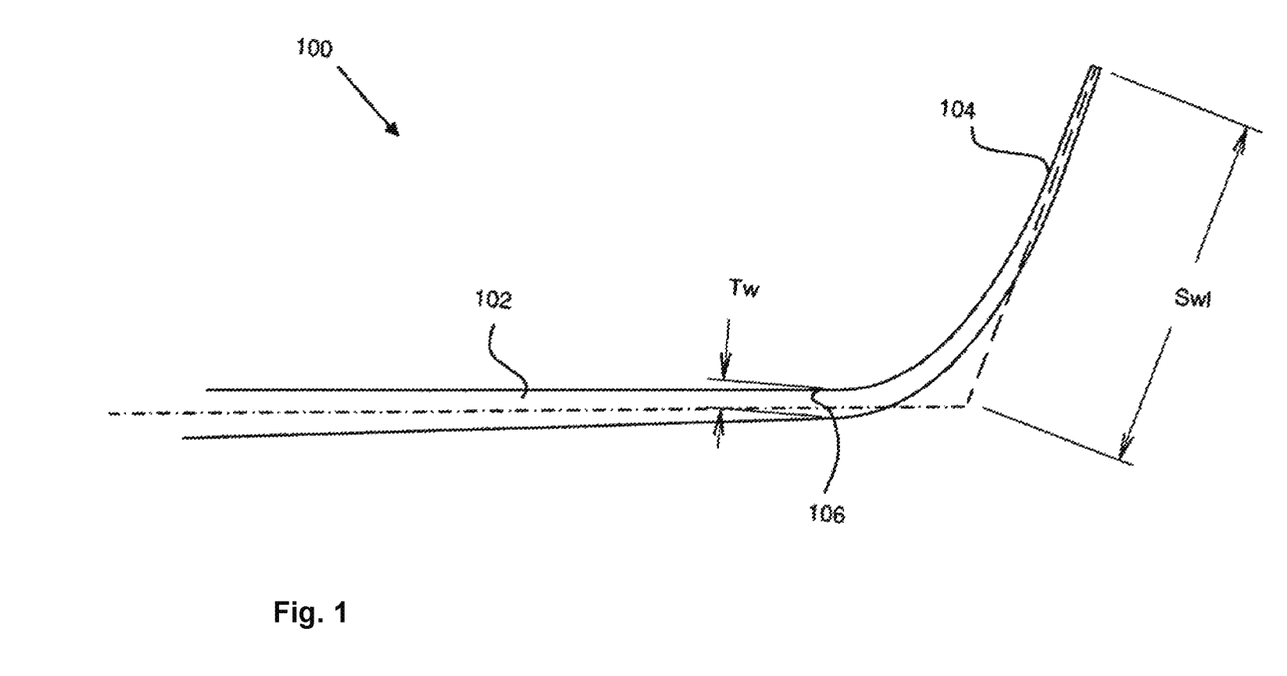
FIG. 1 is a front view of a wing tip and wing tip device.
Figure 2:
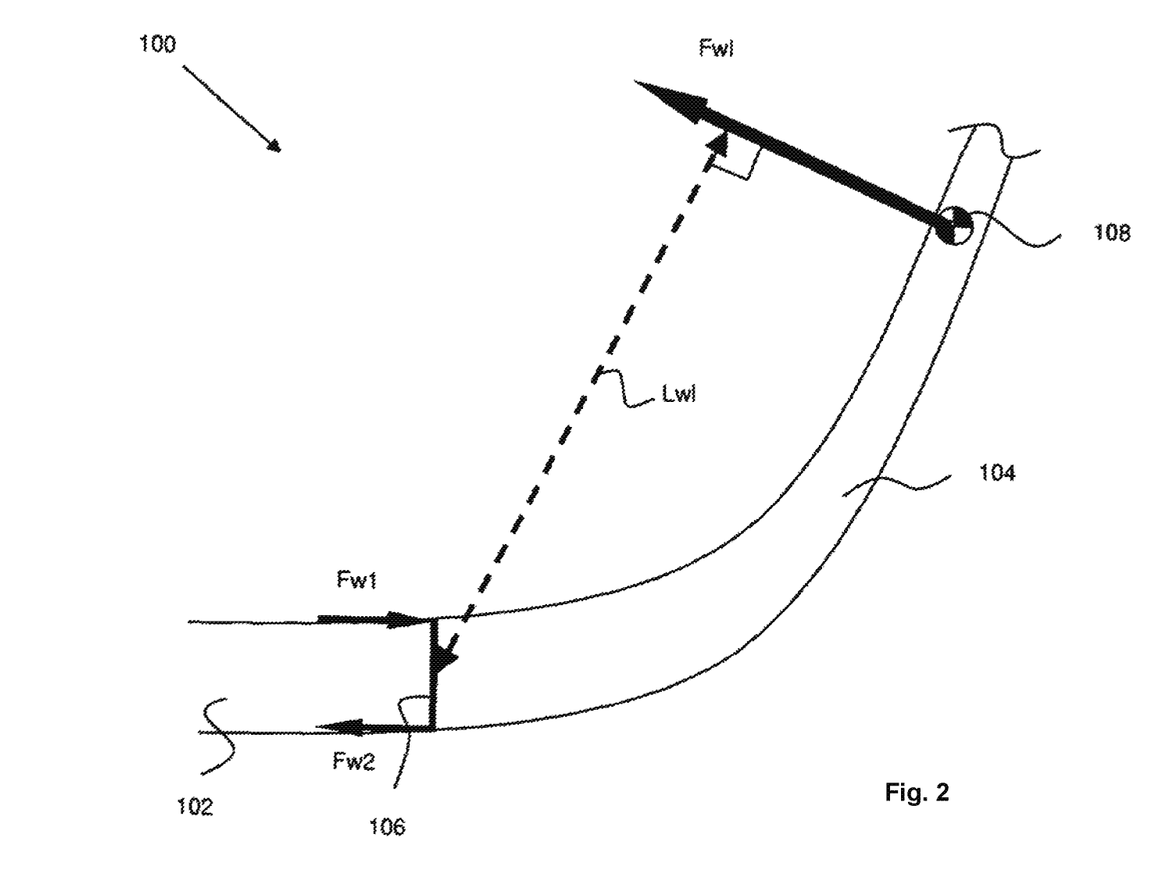
FIG. 2 is a free body diagram of a part of the wing tip and wing tip device of FIG. 1.

Referring to FIG. 1, a wing assembly 100 comprises a wing tip 102 (formed by the end of a wing) and a wing tip device 104. In this example the wing tip device 104 is a winglet. The wing tip 102 terminates at an outboard end 106 with thickness Tw. This area is also known as the wingbox. The wing tip device 104 extends from the outboard end 106 and has a winglet span Swl. Turning to FIG. 2, the wing tip device 104 experiences an aerodynamic lift force Fwl which acts through its centre of pressure 108 generally towards the aircraft fuselage (not shown).

The wing tip device 104 is attached to the wing tip 102 at the outboard end 106. As such a torque, Twl, is generated which is a product of the winglet force Fwl and the perpendicular distance Lwl to the centre of the outboard end 106 of the wing tip 102 (also known as the winglet moment arm).

In order to keep the wing tip device 104 stably attached to the outboard end 106 of the wing tip 102, the torque Twl created by the winglet force Fwl must be reacted at the outboard end 106. Because the moment arm available at the outboard end 106 can only be as high as the wingbox thickness Tw, the reaction forces Fw1, Fw2 are extremely high. As such the material in the area of the outboard end 106 of the wing tip 102 has to be reinforced adding weight and complexity to the aircraft.

As mentioned above, known attachment methods include splice plates which span the upper and lower skin of the wing tip device 104 and the wing tip 102. Alternatively abutting perpendicular plates at the outboard end 106 which are used and held in position by tension bolts. In both cases a moment arm defined vertically between the two wing covers is used to react the forces.

Figures 3A, 3B:
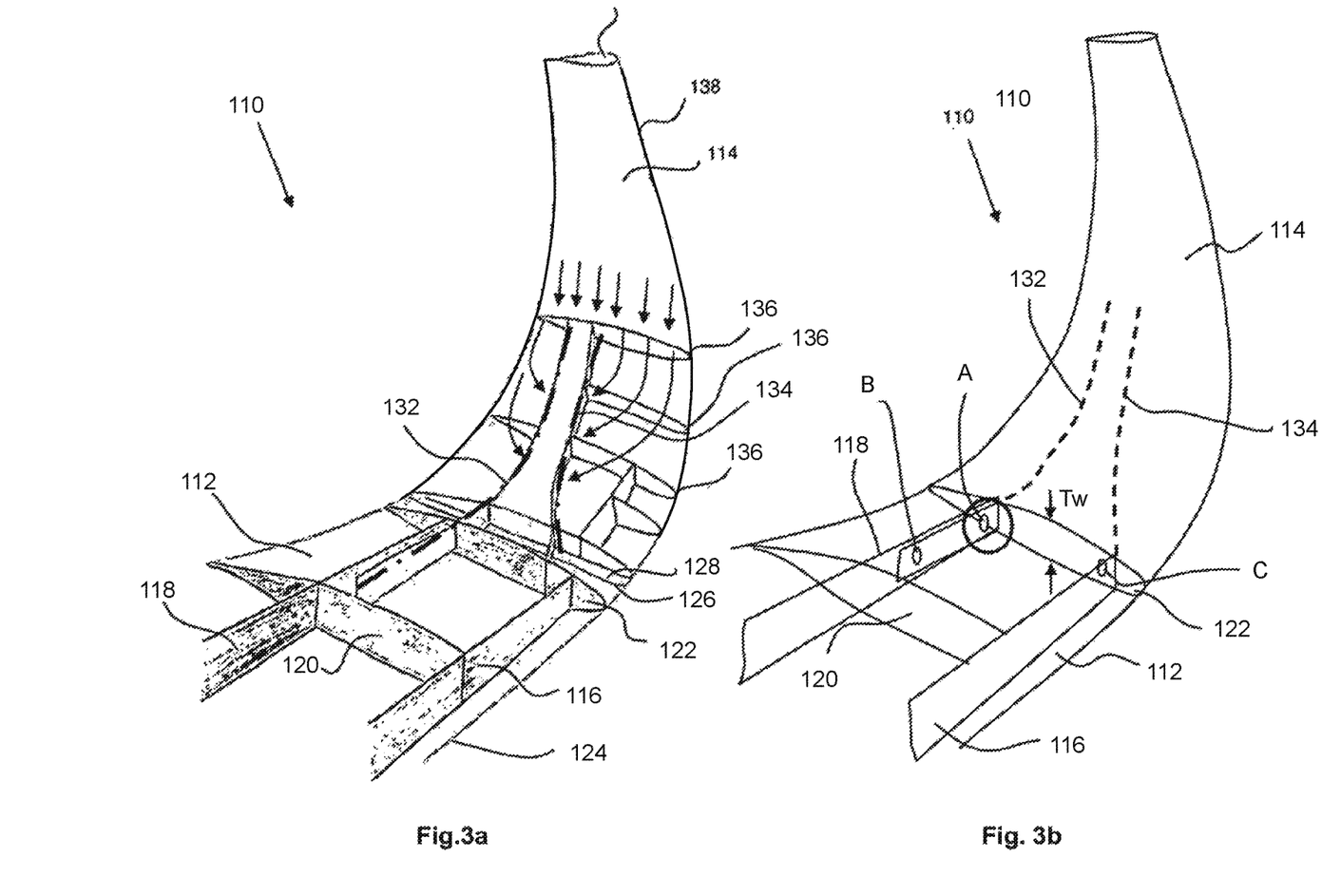

Turning to FIGS. 3a and 3b, a wing assembly 110 is shown comprising a wing tip 112 and a winglet 114. The wing tip 112 comprises a front spar 116 and a rear spar 118, both running in a spanwise direction and converging along the span of the wing towards the wing tip. A series of ribs 120 are positioned along the wing span and extend in the direction of the wing chord. A wing tip end 122 is provided at the end of the wing tip. The spars and ribs are covered by a wing skin 124 primarily designed to present an aerodynamic surface to the airflow. The wing tip 112 terminates at an outboard end 126.

The winglet 114 comprises a winglet root 128 and a free end 130 distanced from and vertically spaced from the winglet root 128.

A main beam 132 (first beam) extends from a position partway between the free end 130 and the winglet root 128 and extends towards the winglet root 128 and beyond into the wing tip 112 as will be described below. The main beam 132 is spaced towards the rear of the winglet 114. A canted spar 134 (second beam) runs from the position midway along the winglet 114 towards the winglet root 128 but diverges from the main beam 132 towards the forward part of the winglet 114. The canted spar 134 extends into the wing tip 112 as will be described below.

The main beam 132 and the canted spar 134 are supported by a number of winglet ribs 136 which extend chordwise within the winglet 114. A winglet skin 138 covers the winglet in order to present an aerodynamic surface to the airflow.

Referring to FIG. 3b, the wing assembly 110 is shown in schematic form. The main beam 132 extends from the winglet 114 into the wingbox of the wing tip 112 to be generally parallel and adjacent to a forward face of the rear spar 118. The main beam 132 is attached to the rear spar 118 at two positions; position B proximate the first rib 120 and position A proximate the wing end rib 122. It will be noted that A and B are spaced apart and, in particular, spaced apart by a distance which is larger than the thickness of the wingbox Tw.

The canted spar 134 also extends into the wing tip 112, but in this example is only arranged to abut the wing tip rib 122 and is attached thereto at point C.

A, B and C are therefore first, second and third mounting formations, and will be described in greater detail below.

Figure 4A:
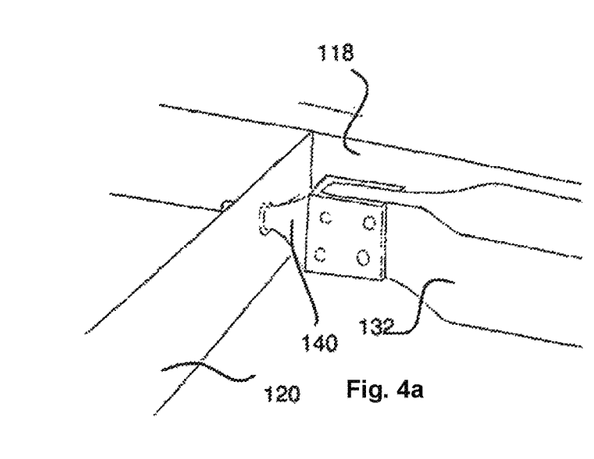
FIG. 4a is a perspective view of a first constraint type.

Turning to FIGS. 4a to 4d, various examples of attachment methods are shown. FIG. 4a shows the main beam 132 attached to the outermost rib 120 via a spigot joint 140.

Figure 4B:
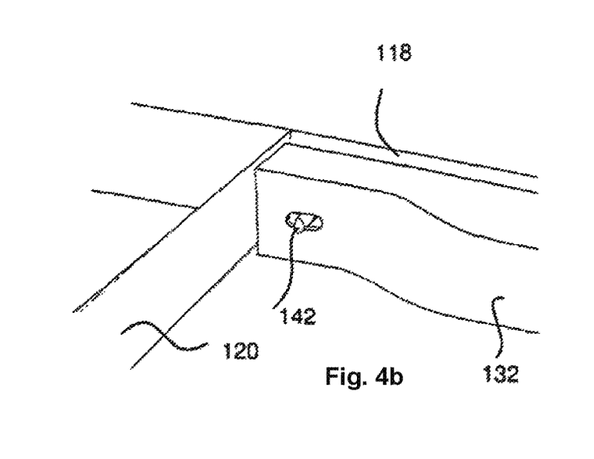
FIG. 4b is a perspective view of a second constraint type.

FIG. 4b shows the main beam 132 attached to the rear spar 118 via a single lap shear joint 142.

Figure 4C:
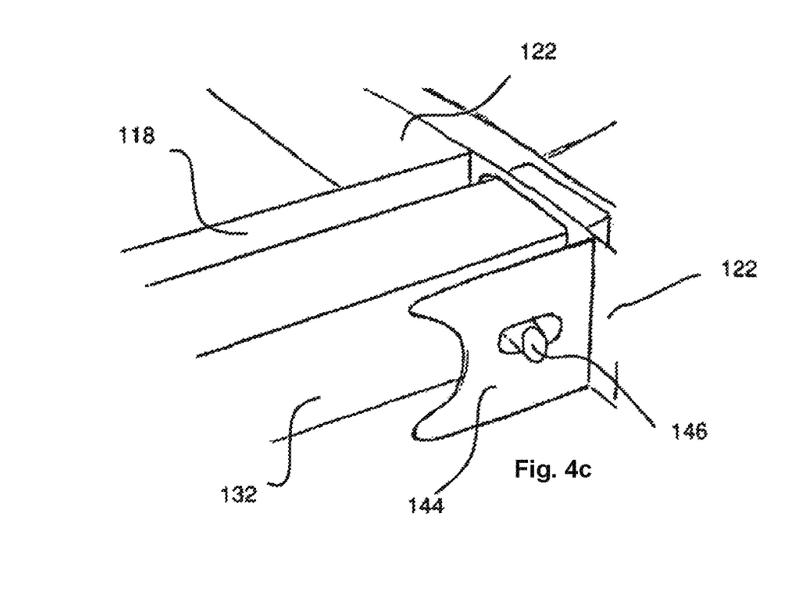
FIG. 4c is a perspective view of a third constraint type.

FIG. 4c shows a main beam 132 passing through the wing tip rib 122 and attached to the rear spar 118 and a sub-spar 144 extending from the wing tip rib 122 via a double lap shear joint 146.

Figure 4D:
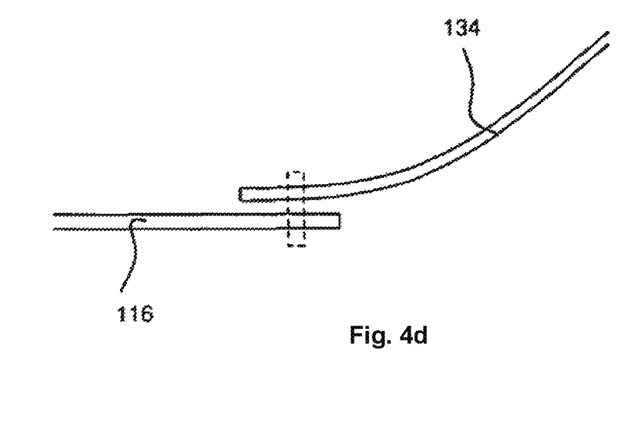
FIG. 4d is a perspective view of a fourth constraint type.

FIG. 4d is a plan view of a canted spar 134 attached to the front spar 116 via a web in single lap shear In the examples shown in FIG. 3b, the attachment at B is a spigot joint per FIG. 4a, the attachment at A is a double lap shear joint as shown in FIG. 4c and the attachment at C is a locking pin.

Referring to FIGS. 5a to 5f, reaction of the various loads and moments will be described. In all cases the co-ordinate system used is X in a positive spanwise direction, Y in a fore aft (chordwise) direction and Z in the vertical direction.

Figure 5A:
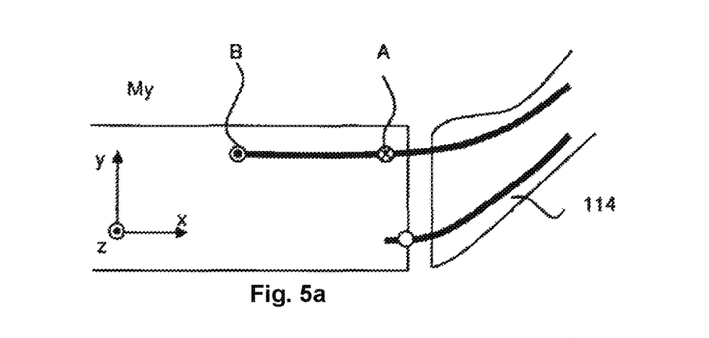
FIGS. 5a to 5f are schematic plan views of various reaction loads exhibited by the mounting apparatus of FIG. 3.

Referring to FIG. 5a, the bending moment MY (the tendency of the tip of the wing tip device to move towards the fuselage) is reacted at attachment points A and B as shown. This is the type of bending moment produced by the winglet lift force Fwl, and as shown it is reacted over a large moment arm (the distance from A to B), reducing the force, and hence stress levels.

Figure 5B:
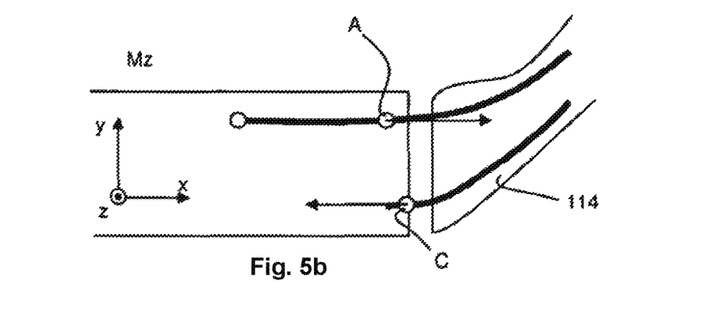

Referring to FIG. 5b, the moment MZ (mainly resulting from drag) is reacted where the winglet abuts the wing tip at the trailing edge proximate the attachment formation A and at the connection at attachment formation C which is held in direction X.

Figure 5C:
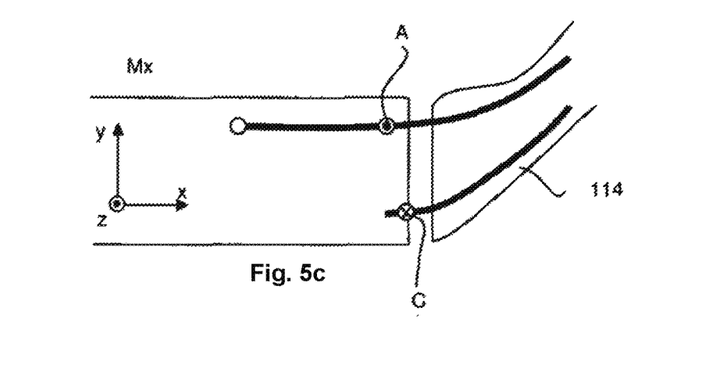

Referring to FIG. 5c, the torsion MX is reacted by the fact that attachment formations A and C are constrained in the vertical direction (i.e. in direction Z).

Figure 5D:
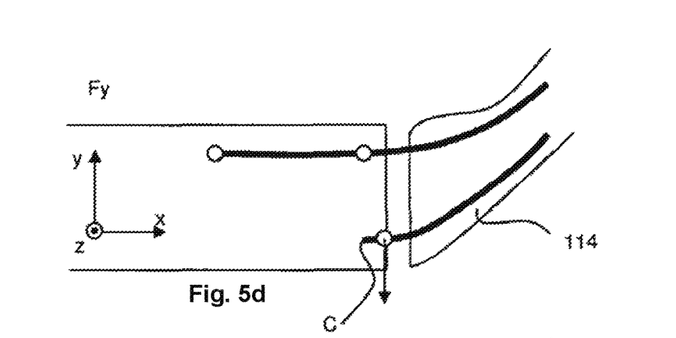

Referring to FIG. 5d, FY (drag force) is reacted primarily at attachment formation C.

Figure 5E:
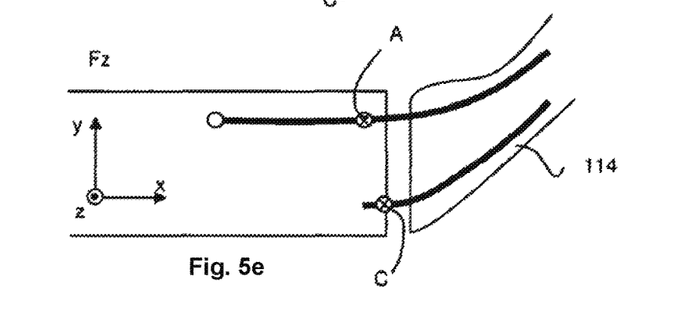

Referring to FIG. 5e, FZ (lift) is reacted at points A and C.

Figure 5F:
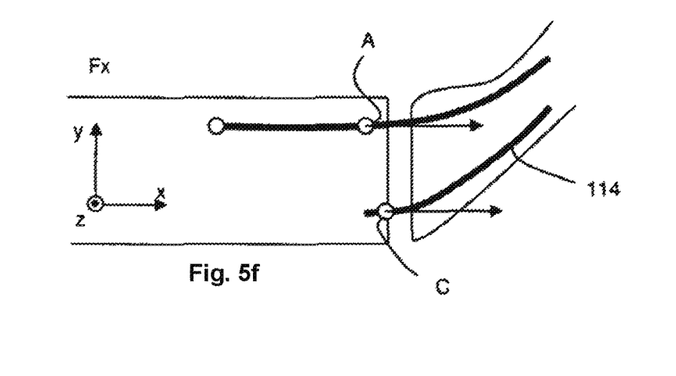

Finally, referring to FIG. 5f, the side force FX is reacted at points A and C.

The release of certain degrees of freedom (e.g. the inability of the spigot at B to react the side force FX) allows the system some relative movement to avoid thermally induced stresses whilst making the loads more predictable (moving towards a statically determinate system). For example, because the joint at point B does not need to react the side force, it can be made smaller as a result (i.e. can be optimised for a more predictable load case).

It will be noted that because the present invention only uses three attachment formations A, B and C (also referred to as attachment points), it is possible to constrain the winglet 114 in a manner which makes the system statically determinate. Therefore, each attachment formation can be designed around a known load case. This offers an advantage over the prior art in which generally a high number of fixings are used for load-bearing purposes and consequently a statically indeterminate system is formed in which the exact load case on each attachment formation is unknown. Therefore each attachment formation has to be over-engineered to cope with the worst possible case.

Figure 6A:
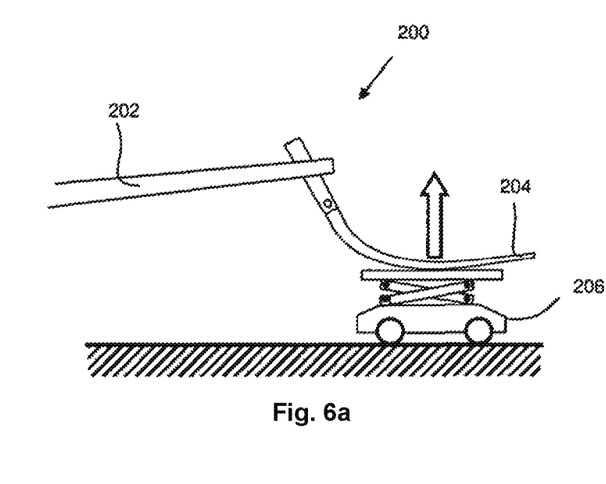
FIGS. 6a to 6d are front schematic views of an attachment method of a wing tip device according to the present invention.
Figure 6B:
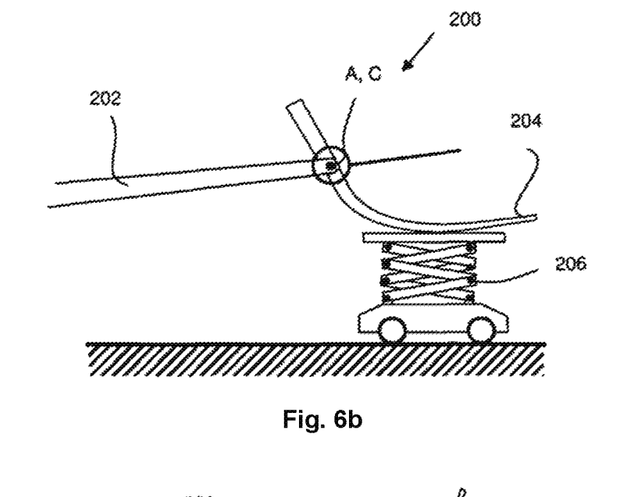
Figure 6C:
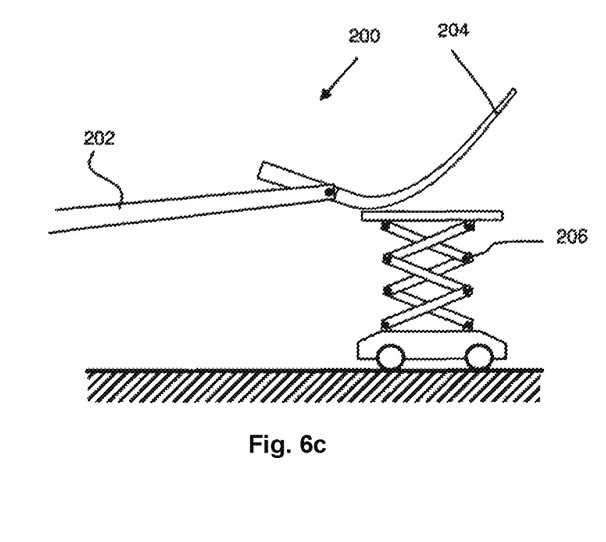
Figure 6D:
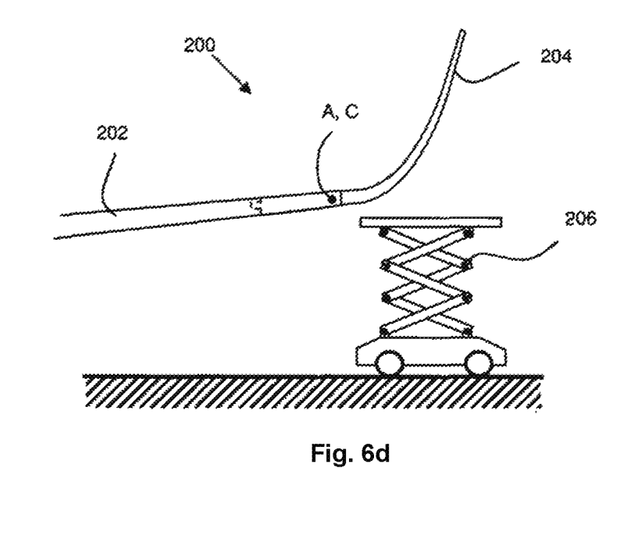

Referring to FIGS. 6a to 6d, a method of attachment of a wing tip device is shown. A wing assembly 200 is shown comprising a wing tip 202 and a winglet 204. The winglet 204 is attached to the wing tip 202 in a similar manner to the wing assembly 110. In the wing assembly 200, the attachment formations A and C have their horizontal chordwise axes (parallel to axis Y) of rotation aligned as will be described below. The winglet 204 is moved proximate the wing tip 202 on a trolley jack or similar as shown in FIG. 6a. The jack 206 is elevated to move the winglet 204 such that the attachment formations A, C are aligned with their respective receiving formations on the wing tip 202. The joints can then be assembled such that the winglet 204 can be rotated above the axis Y at the attachment formations A, C from the position shown in FIG. 6B to the position shown in FIG. 6C. The winglet 204 is rotated into place and the attachment formation B is secured in order to prevent any rotation of the winglet 204 relative to the wing tip 202. The jack 206 can then be removed, as shown in FIG. 6d.

This method of assembly demands an interruption in the skin on the top of the wing tip 202. This can be achieved by making the winglet mean beam part of the aerodynamic surface of the wing (see below) or providing a replaceable panel in the wing skin. The method permits replacement of the winglet in-field without the need for an overhead crane and/or hanger space.

Figure 7:
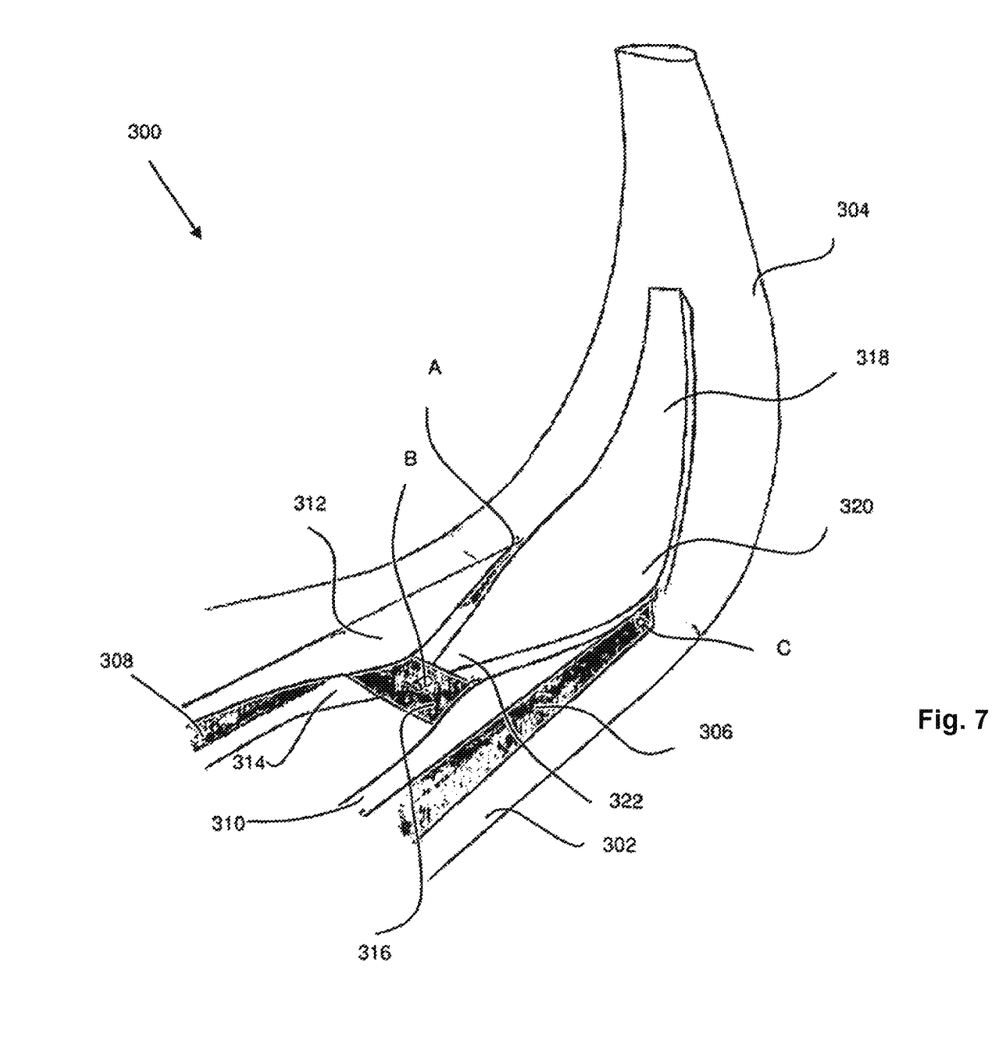
FIG. 7 is a perspective view of a second wing tip device in accordance with the present invention.

Referring now to FIG. 7, a wing assembly 300 is shown comprising a wing tip 302 and a winglet 304.

The wing tip 302 comprises a front spar 306 and a rear spar 308. A front spar 306 comprises two flanges extending in a chordwise direction; an upper flange 310 and a lower flange (not visible). The flanges extend towards the rear spar 308. Similarly, the rear spar 308 comprises an upper flange 312 and a lower flange 314 both of which extend towards the front spar 306. A rib 316 extends between the spars 306, 308 in a chordwise direction at the widest parts of the flanges 310, 312, 314.

The winglet 304 comprises a flat main beam 318 which extends substantially parallel to the skin of the winglet 304. The main beam 318 tapers from a point midway along the winglet 304 to its thickest cross-section at a mid-point 320 at the position where the winglet and the wing tip meet and tapers inwardly again at attachment formation 322 within the wing tip 302.

The beam 318 is attached to the wing tip 302 via a spigot joint forming attachment formation B, a lap shear joint forming attachment formation A (a pivotable joint) and a further lap shear joint formation attachment formation C (a pivotable joint). The axes of rotation of the lap joints at attachment formations A and C are aligned such that the winglet 304 can be assembled to the wing tip 302 in a similar manner as described in FIGS. 6a to 6d.

Figure 8A:
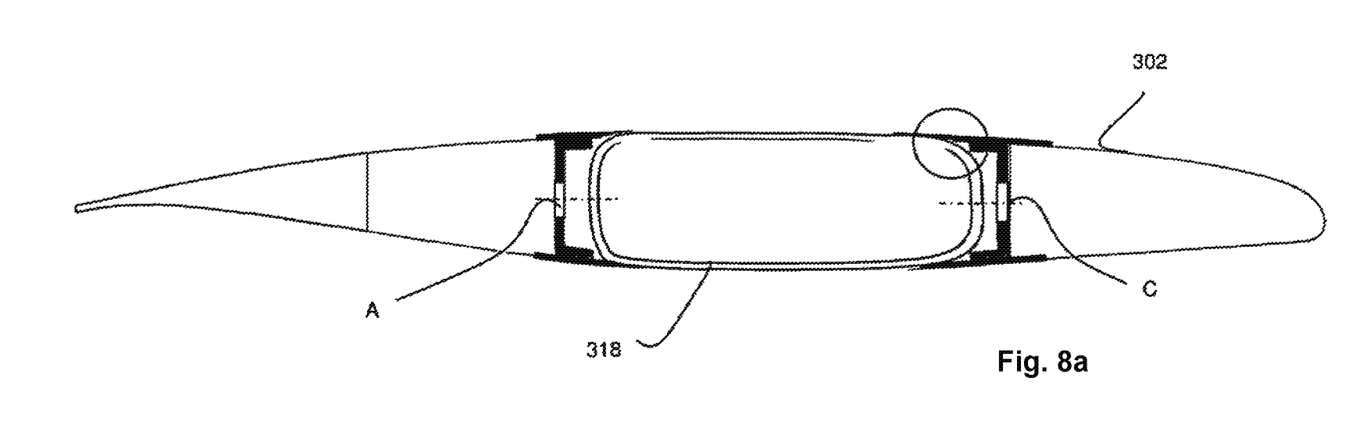
FIG. 8a is a chordwise cross-section view of a wing tip fitted with the wing tip device of FIG. 7.
Figure 8B:
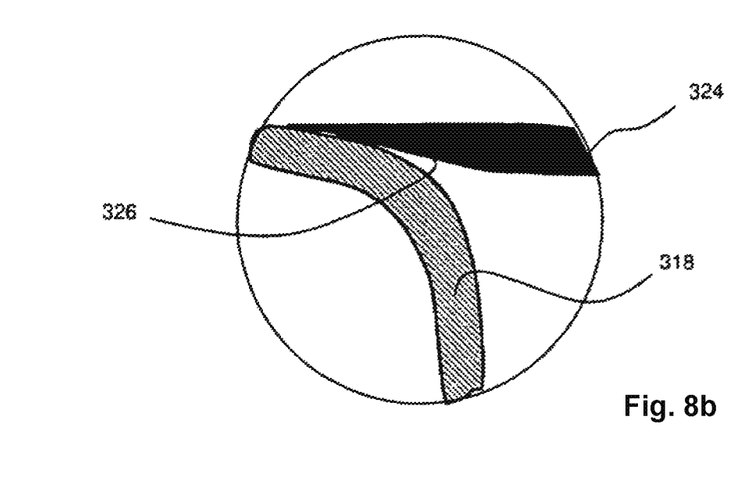
FIG. 8b is a close-up view of a part of the wing tip device of FIG. 7 shown in plan section view.

It will be noted that the beam 318 tapers from the point of maximum bending moment at area 320 to areas of lower bending moment at its opposite ends within both the winglet 304 and the wing tip 312. Referring to FIG. 8a, a section is shown through the wingbox of the wing tip 302 proximate points A and C. It will be noted that the main beam 308 is designed to form part of the aerodynamic surface of the wing. Referring to FIG. 8b, the skin of the wing tip 302 is transitioned to the main beam 318 by use of flexible skin panels 324 which define a tapered region 326 to allow transition to the surface of the beam 318. In this way, the beam 318 can be as large as possible in order to provide as much area for reaction on the various loads and stresses it undergoes.

It will also be noted that by making the beam 318 part of the wing skin, the assembly process as shown in FIGS. 6a to 6d is made easier as the skin of the wing tip 302 does not need to be replaced over the beam 318.

Variations fall within the scope of the present invention. The invention is:

1. A method of assembling a wing tip device to a wing of a powered aircraft comprising the steps of:
   providing a wing tip,
   providing a wing tip device,
   attaching the wing tip device to the wing tip at a first position on the wing tip, wherein the attachment at the first position includes a first joint;
   pivoting the wing tip device about the first joint, and
   after the pivoting step, attaching the wing tip device to the wing tip at a second position on the wing tip, wherein the second position is spaced from the first position in a spanwise direction of the wing.

2. The method of claim 1, in which the first position is closer to the wing tip device than the second position, and the second position is inboard in the spanwise direction of an end of the wing tip.

3. The method of claim 1, in which the wing tip device comprises a first beam extending from the wing tip device and into the wing tip, wherein the first beam is attached to the wing tip at both the first and second positions, and in which an outer surface of the first beam forms part of an outer aerodynamic skin of the wing tip.

4. A method of assembling a wing tip device to a wing of a powered aircraft in which the wing tip device comprises:
   a first beam extending from the wing tip device, the first beam includes a first attachment formation forming a portion of the first joint;
   a second beam extending from the wing tip device and spaced in a chordwise direction from the first beam;
   the method comprises:
   attaching the wing tip device to the wing tip at a first position on the wing tip, wherein the attachment at the first position includes a first joint;
   attaching the second beam to the wing tip at a third position on the wing tip, wherein the attachment at the third position forms a third joint,
   pivoting the wing tip device about the first and third joints, and
   after the pivoting step, attaching the wing tip device to the wing tip at a second position on the wing tip spaced from the first position.

5. The method of claim 4 wherein, during the pivoting step, the wing tip device is pivoted above an axis of rotation of the wing tip device which extends through the first and second joints.

6. The method of claim 4 wherein the first beam includes a second attachment formation and the step of attaching the wing tip device to the wing tip at the second position comprises attaching the wing tip device to the wing tip using the second attachment formation.

7. The method of claim 1, wherein the wing tip is a region of the wing including a rib and a portion of at least one spar.

8. A method of mounting a wing tip device to a wing of a powered aircraft, wherein the wing tip device includes a main beam that extends in a span-wise direction from a root of the wing tip device;
   aligning a first attachment point on the main beam with a first corresponding attachment point on the wing;
   forming a first joint between the first attachment point of the main beam and the first corresponding attachment point on the wing;
   pivoting the wing tip device about the first joint to align a second attachment point on the main beam with a second corresponding attachment point on the wing; and
   fastening the second attachment point of the main beam to the second corresponding attachment point on the wing, wherein the second attachment point is spaced from the first attachment point in a spanwise direction of the wing.

9. A method of mounting a wing tip device to a wing of a powered aircraft, wherein the wing tip device further includes a spar which extends in the span-wise direction from the root of the wing tip device, and the main beam and spar are separated in a chordwise direction, and the method comprises:
   aligning a first attachment point on the main beam with a first corresponding attachment point on the wing;
   forming a first joint between the first attachment point of the main beam and the first corresponding attachment point on the wing;
   pivoting the wing tip device about the first joint to align a second attachment point on the main beam with a second corresponding attachment point on the wing;
   fastening the second attachment point of the main beam to the second corresponding attachment point on the wing;
   aligning a third attachment point on the spar with a third corresponding attachment point on the wing, and
   forming a third joint between the third attachment point of the spar and the third corresponding attachment point on the wing,
   wherein the step of pivoting the wing tip device includes pivoting the wing tip device about an axis of rotation extending through the first and third attachment points.

10. A method of mounting a wing tip device to a wing of a powered aircraft, wherein the wing is a fixed wing of the powered aircraft and the wing tip device includes a main beam that extends in a span-wise direction from a root of the wing tip device;
   aligning a first attachment point on the main beam with a first corresponding attachment point on the wing;
   forming a first joint between the first attachment point of the main beam and the first corresponding attachment point on the wing;
   pivoting the wing tip device about the first joint to align a second attachment point on the main beam with a second corresponding attachment point on the wing; and
   fastening the second attachment point of the main beam to the second corresponding attachment point on the wing.

11. The method of claim 10, wherein the first corresponding attachment point is proximate an end of the fixed wing, and the second corresponding attachment point is inboard of the first attachment point.

\* \* \* \* \*